(12) United States Patent
Ragan

(10) Patent No.: US 10,690,534 B2
(45) Date of Patent: Jun. 23, 2020

(54) LIM-DRIVEN ROLLER CHECKWEIGHER

(71) Applicant: Laitram, L.L.C., Harahan, LA (US)

(72) Inventor: Bryant G. Ragan, Metairie, LA (US)

(73) Assignee: Laitram, L.L.C., Harahan, LA (US)

( * ) Notice: Subject to any disclaimer, the term of this patent is extended or adjusted under 35 U.S.C. 154(b) by 249 days.

(21) Appl. No.: 15/576,964

(22) PCT Filed: May 26, 2016

(86) PCT No.: PCT/US2016/034242
§ 371 (c)(1),
(2) Date: Nov. 27, 2017

(87) PCT Pub. No.: WO2016/209523
PCT Pub. Date: Dec. 29, 2016

(65) Prior Publication Data
US 2018/0164146 A1    Jun. 14, 2018

Related U.S. Application Data

(60) Provisional application No. 62/185,034, filed on Jun. 26, 2015.

(51) Int. Cl.
*G01G 11/12* (2006.01)
*G01G 19/00* (2006.01)
(Continued)

(52) U.S. Cl.
CPC .............. *G01G 11/12* (2013.01); *G01G 11/04* (2013.01); *G01G 19/005* (2013.01); *G01G 19/035* (2013.01)

(58) Field of Classification Search
CPC ...... G01G 11/04; G01G 11/12; G01G 19/005; G01G 19/035; B07C 5/36; B07C 5/38; B65G 17/24; B65G 47/53
See application file for complete search history.

(56) References Cited

U.S. PATENT DOCUMENTS 3,265,140 A   8/1966 Mayer
4,550,793 A   11/1985 Giles
(Continued)

FOREIGN PATENT DOCUMENTS

CN   104271476 A   1/2015
EP   0953828 A1    11/1999
(Continued)

OTHER PUBLICATIONS

Supplementary European Search Report of European Application No. EP16814971.4, dated Jan. 14, 2019, European Patent Office, Munich, Germany.
(Continued)

*Primary Examiner* — Elias Desta
(74) *Attorney, Agent, or Firm* — James T. Cronvich

(57) ABSTRACT

A weighing conveyor system, a checkweigher, and a method for weighing conveyed objects with a checkweigher comprising LIM-driven rollers positioned in a conveying line and position sensors for determining the objects' weights from the motion of the objects across the rollers. The LIM drives the rollers with a constant torque. The acceleration of an object driven by the rollers is inversely proportional to the object's weight. So an object's weight can be determined by the effect of the rollers on its motion.

13 Claims, 4 Drawing Sheets

(51) Int. Cl.
  *G01G 19/03* (2006.01)
  *G01G 11/04* (2006.01)

(56) References Cited

U.S. PATENT DOCUMENTS

| | | | |
|---|---|---|---|
| 5,990,422 A * | 11/1999 | Komori | G01G 19/035 |
| | | | 177/119 |
| 7,096,152 B1 | 8/2006 | Ong | |
| 7,820,923 B1 | 10/2010 | Daboub | |
| 8,829,366 B2 * | 9/2014 | Yuan | G01G 11/04 |
| | | | 177/145 |
| 9,428,338 B2 * | 8/2016 | Ragan | B65G 17/24 |
| 2009/0071728 A1 | 3/2009 | Turner | |
| 2009/0216487 A1 | 8/2009 | Streder et al. | |
| 2011/0290569 A1 | 12/2011 | Turner | |

FOREIGN PATENT DOCUMENTS

| | | |
|---|---|---|
| EP | 2865616 A1 | 4/2015 |
| WO | 2008058543 A1 | 5/2008 |
| WO | 2013169343 A1 | 11/2013 |
| WO | 2016122869 A1 | 8/2016 |

OTHER PUBLICATIONS

China National Intellectual Property Administration Search Report of Chinese Application No. 201680037728.9, dated Oct. 29, 2019.

\* cited by examiner

LIM-DRIVEN ROLLER CHECKWEIGHER

BACKGROUND

The invention relates generally to checkweighers in power-driven conveyor systems.

Many production operations use weight measurements to control quality. For example, a beverage-packing facility producing cases of cans may weigh the packed cases to ensure that all the cans are full. Underweight cases may indicate leaking or incompletely filled cans. Checkweighers that include a weigh scale are commonly used to weigh cases, packages, or other conveyed objects. The checkweighers, which typically include a short conveyor belt, form part of a conveyor line. Many checkweighers require that the objects to be weighed halt while the scale reads the weight. And checkweighers that can measure the weight of a moving object require that only one object at a time be conveyed over the scale. So the objects to be weighed must be separated by large gaps, which slows throughput.

SUMMARY

One version of a weighing conveyor system embodying features of the invention comprises an upstream conveyor, a downstream conveyor, and a roller transfer device interposed between the downstream end of the upstream conveyor and the upstream end of the downstream conveyor. The upstream conveyor has a downstream end and conveys objects in a conveying direction to the downstream end. The downstream conveyor has an upstream end and receives the objects conveyed by the upstream conveyor. The roller transfer device transfers the objects received from the upstream conveyor to the downstream conveyor in the conveying direction. The roller transfer device includes a roller drive system and an array of rollers. At least some of the rollers are active rollers rotated by the roller drive system at a constant torque to propel the objects received from the upstream conveyor in the conveying direction to the downstream conveyor. The acceleration of each of the objects in the conveying direction on the roller transfer device is inversely proportional to the object's weight. A sensor system determines the weight of each of the objects from the effect of the roller transfer device on the motion of the object in the conveying direction.

In another aspect, a checkweigher embodying features of the invention comprises a roller transfer device and a sensor system determining the weight of each of the objects from the effect of the roller transfer device on the motion of the object in the conveying direction. The roller transfer device includes a roller drive system and an array of rollers. At least some of the rollers are active rollers rotated by the roller drive system at a constant torque to propel objects in a conveying direction. The acceleration of each of the objects in the conveying direction on the roller transfer device is inversely proportional to the object's weight.

In yet another aspect, a method for weighing conveyed objects comprises: (a) conveying objects separated by a gap in a conveying direction to an array of rollers; (b) rotating the array of rollers with a constant torque to accelerate each of the objects in the conveying direction to a speed that is inversely proportional to the weight of the object; and (c) determining the weight of each of the objects from the change in the gap caused by the array of rollers.

DETAILED DESCRIPTION

Figure 1:
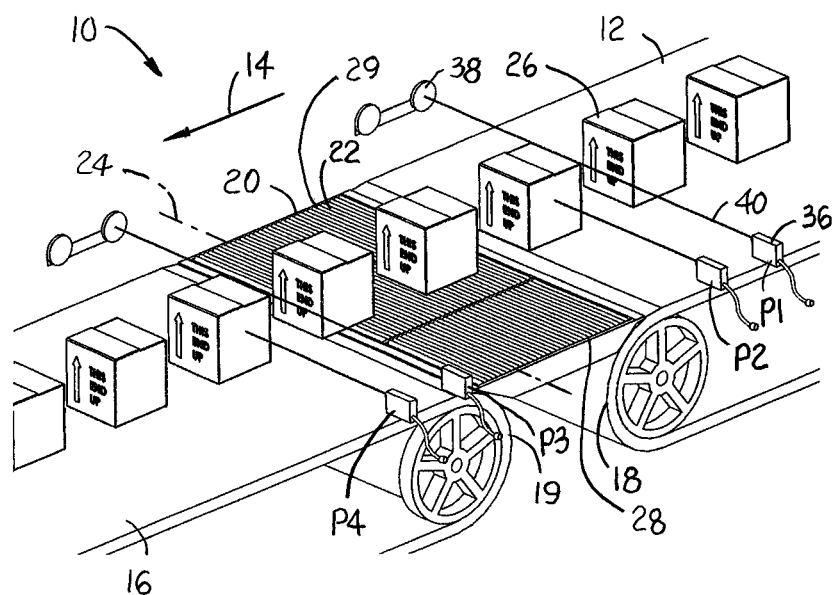
FIG. 1 is an isometric view of one version of a weighing conveyor system embodying features of the invention including a LIM-driven roller-conveyor checkweigher and position sensors.
Figure 2:
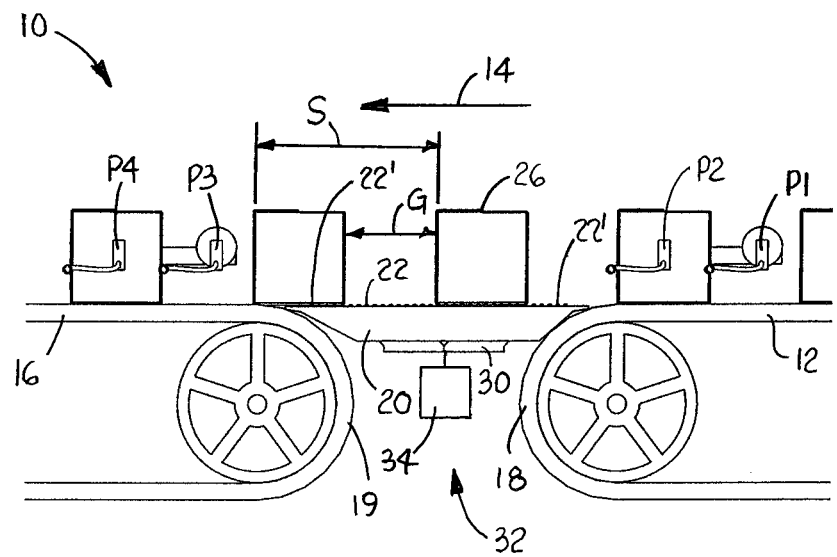
FIG. 2 is a side elevation view of the conveyor system of FIG. 1 conveying filled cases.

A weighing conveyor system embodying features of the invention is shown in FIGS. 1 and 2. The conveyor system 10 comprises an upstream infeed conveyor 12 conveying objects, such as cases of bottles or cans, downstream in a conveying direction 14 to a discharge conveyor 16. In this example the conveyors 12, 16 are shown as belt conveyors. Interposed in the conveying line between the downstream end 18 of the upstream conveyor 12 and the upstream end 19 of the downstream conveyor 16 is a roller transfer device 20.

The roller transfer device 20 comprises an array of parallel rollers 22 arranged to rotate on axes 24 perpendicular to the conveying direction 14. The rollers 22 are depicted as cylinders that extend across the width of the roller transfer device. The cylinders can be continuous or segmented across the width of the transfer device 20. If segmented, all the segments of the roller 22 rotate together. The rollers are made of an electrically conductive material, such as aluminum or copper, and may be coated with a high-friction material, such as rubber or an elastomer, for a better grip on conveyed objects 26. The rollers 22 terminate at their ends in axles received in low-friction bearings (not shown) in the sides 28, 29 of the roller transfer device 20.

The rollers 22 are rotated by a roller drive system shown in FIG. 2 as a linear-induction-motor (LIM) stator 30. The stator 30 produces a magnetic flux wave that passes through the rollers 22. The flux wave induces eddy currents in the conductive material of the rollers 22. The eddy currents produce a reaction field that interacts with the stator's magnetic flux wave to create a constant torque on the rollers 22. The conductive rollers act as rotors and form a LIM with the stator 30. The rollers 20 are active rollers rotated by the stator 30 to convey objects 26 in the conveying direction 14. Because the space 32 between the upstream and downstream conveyors 12, 16 is wider at the top than in the middle owing to the sprocket sets 34 around which the conveyor belts are trained, the housing of the roller transfer device 20 is shaped larger at its top than at its bottom to better fill the space 32. Some of the rollers 22' that extend over the ends 18, 19 of the upstream and downstream conveyors 12, 16 may be passive, or idle, rollers not actively rotated by induction. The stator 30 is oriented so that the flux wave travels perpendicular to the roller axes 24. In that orientation the stator 30 produces a motive force in enough of the rollers 22 to move the objects 26 in the conveying direction 14 along the roller transfer device 20 and compensate for any loss of momentum that would occur if all the rollers were passive.

The constant torque of the inductively rotated rollers 22 results in a constant acceleration of the objects 26 on the transfer device 20. A characteristic of the constant acceleration is that the rollers accelerate heavy objects more slowly than light objects. So the constant acceleration of an object is inversely proportional to its weight. For an object undergoing a constant acceleration, the speed and the displacement of the object will also be similarly inversely proportional to the object's weight. The upstream conveyor 12 delivers objects 26 to the roller transfer device 20 on equal standard spacings S or separated by standard gaps G. The stator 30 is driven by a variable-frequency drive (VFD) 34. The VFD 34 is set to drive the LIM to maintain the standard gap G between, or the standard spacing S of, consecutive objects 26 of the same weight as they are transferred from the upstream conveyor 12 to the downstream conveyor 16. Light objects, such as underfilled or leaking cans in a case, accelerate across the roller transfer device 20 more quickly, which reduces the standard gap G to a reduced gap G' or the standard spacing S to a reduced spacing S' with a preceding heavy object and increases the standard gap G to an increased gap G" or the standard spacing S to an increased spacing S" with a following heavy object, as shown in FIG. 3.

Figure 3:
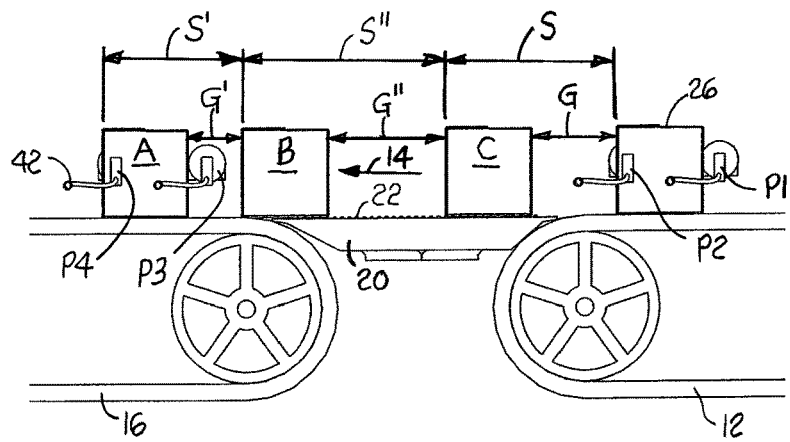
FIG. 3 is a side elevation view of the conveyor system of FIG. 1 conveying filled and unfilled cases.

FIG. 3 also shows the positions of two pairs of sensors P1, P2 and P3, P4 used to detect the presence of objects 26 on the conveyor system. The sensors P1-P4, also shown in FIGS. 1 and 2, are part of a sensor system used to determine the change in the gap G or the spacing S of the objects caused by the constant torque of the rollers 22 in the roller transfer device 20. As shown in FIG. 1, each of the sensors P1-P4 may be realized as an optical sensor that includes an optical transmitter-receiver unit 36 on one side 28 of the conveyor system and a reflector 38 on the opposite side 29. The transmitter-receiver unit 36 transmits a light beam 40 across the conveyor, which is reflected back when not blocked by an object 26. The light beam is not reflected back to the transmitter-receiver unit when interrupted by an object 26. Each pair of sensors P1, P2 and P3, P4 is located at a fixed location along the length of the conveyor system 10. In this example the upstream sensors P1, P2 are located along the upstream conveyor 12 near its downstream end 18. The downstream sensors P3, P4 are located along the downstream conveyor 16 near its upstream end 19. The distance between the two sensors of each pair is known.

In FIG. 3 the objects A and C are standard-weight objects, while the object B is an underweight object. As FIG. 3 shows, all the objects 26 entering the roller transfer device 20 from the upstream conveyor are equi-spaced on spacings S with gaps G. When the objects 26 encounter the rollers 22 rotating with a constant torque, the lighter underweight object B is propelled forward in the conveying direction 14 with a greater acceleration than the preceding heavier standard object A and the following heavier standard object C. The greater acceleration of the object B reduces the preceding gap G' and spacing S' and increases the following gap G" and spacing S" from the standard gap G and spacing S.

Figure 4:
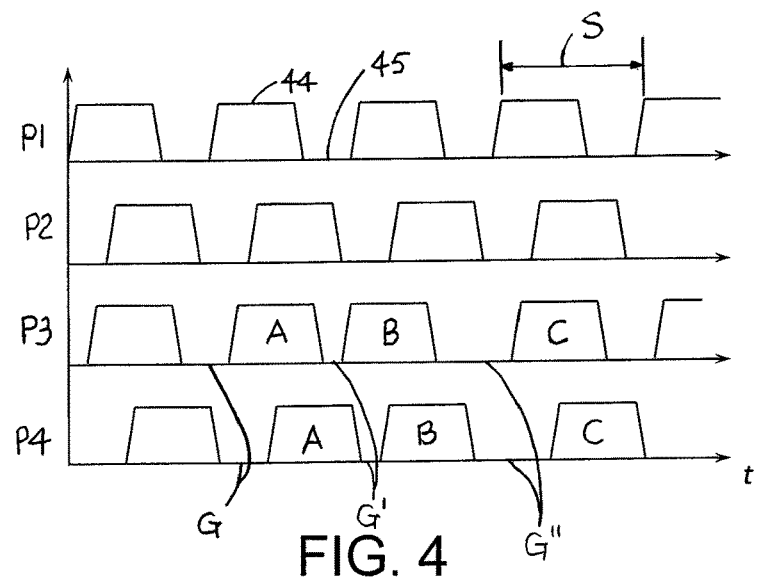
FIG. 4 is a timing diagram of the outputs of the four sensors in FIG. 3.

The change in the gap and spacing is illustrated in the timing diagrams of FIG. 4. The timing diagrams represent digital outputs of the sensors P1-P4 on signal lines 42. A high signal level 44 indicates the blocking of a sensor's light beam by a passing object on the conveyor. A low signal level 45 indicates gaps G between objects when the light beam is not blocked from reflecting back. Spacings S are indicated by the difference between the rising edges of the signals caused by detection of the front ends of consecutive objects. The upper two timing diagrams show the regular spacing of the objects on the upstream conveyor indicated by the outputs of the sensors P1 and P2. The two lower timing diagrams, representing the outputs of the pairs of sensors P3 and P4 on the downstream conveyor, indicate the reduced gap G' between the underweight object B and the preceding object A and the increased gap G" between the object B and the following heavier standard-weight object C. The system can be calibrated from empirical data, for example, to define the functional relationship between the change in gap length from the standard gap G and the weight of an object. So, in this way, the roller transfer device can be used as a checkweigher that does not require objects to be stopped or to be separated by large gaps to be weighed accurately. And, because the weight of an object is determined by the effect of the roller transfer checkweigher on the object's motion, no weigh scale is used.

Other sensor arrangements are possible. For example, the two pairs of sensors P1, P2 and P3, P4 of FIG. 3 could each be replaced by a single sensor. The advantage of using pairs of sensors is that realtime measurements of upstream and downstream conveyor speeds can be made. With only one sensor upstream and one downstream, the speeds have to be measured in other ways. And the operation described with respect to FIGS. 3 and 4 was simplified for the situation in which the upstream conveyor 12, the downstream conveyor 16, and the roller transfer device 20 all conveyed the standard-weight objects 26 at the same speed. Any difference in the speeds of the conveyors would affect the gaps. And if the upstream conveyor does not deliver the objects on equal spacings or separated by equal gaps, two pairs of sensors as in FIG. 3 could be used to determine the change in the spacings or gaps caused by the roller transfer device. With pairs of sensors, as in FIG. 3, the speed of the conveyors can be determined and considered in determining the weights.

Figure 5:
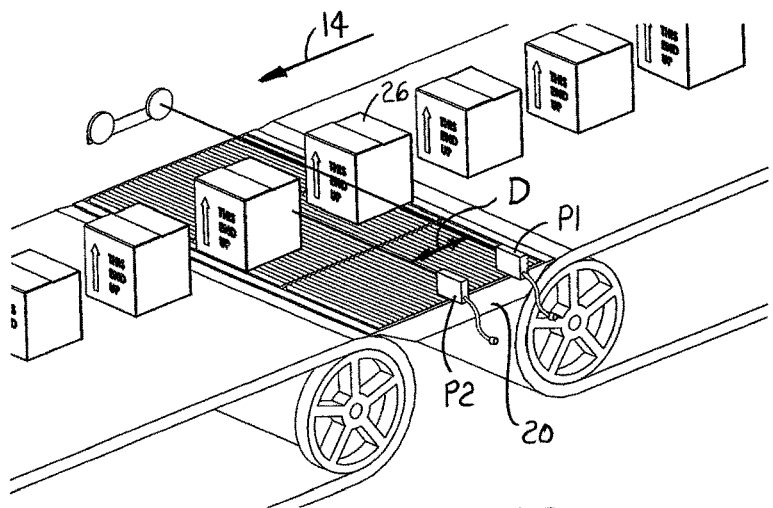
FIG. 5 is an isometric view of a conveyor system as in FIG. 1 with the sensors sensing the packages on the checkweigher.

FIG. 5 shows another sensor arrangement in which the sensors P1 and P2 are both positioned at the side of the roller transfer device 20. The sensors P1 and P2 are spaced apart in the conveying direction 14 by a fixed known distance D. The time for an object 26 to first break the light beam of the upstream sensor P1 to the time for the object to first break the beam of the downstream sensor P2, i.e., the time the object takes to travel the distance D, is inversely proportional to the acceleration and the change in the speed of the object propelled by the constant-torque rollers and is proportional to the object's weight. Although the proportionality may not be a linear relationship, the relationship between time and weight is monotonic and can be empirically determined for various conditions.

Figure 6:
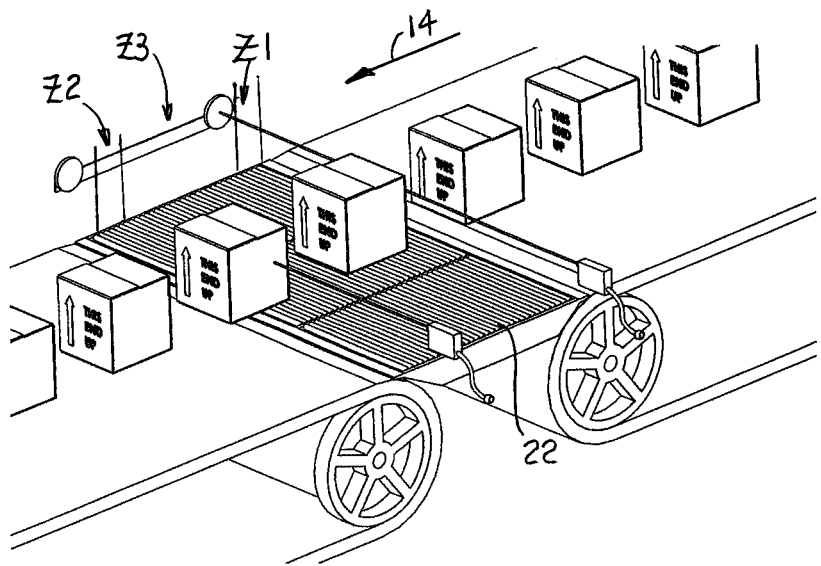
FIG. 6 is an isometric view of a conveyor system as in FIG. 1, in which the checkweigher has deceleration, coast, and acceleration zones.
Figure 7:
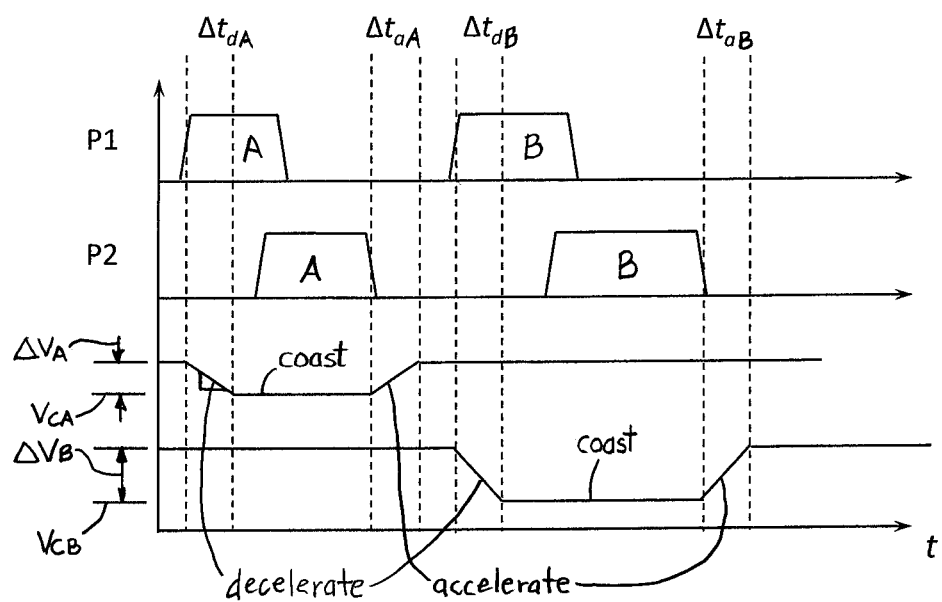
FIG. 7 is a timing diagram of the outputs of the sensors in FIG. 6.

FIG. 6 shows another version of the conveyor system that divides the roller transfer device 20 into three zones Z1, Z2, and Z3. In the first zone Z1, a deceleration zone at the entrance to the transfer device 20, the rollers 22 are active and rotated by a LIM stator at a constant torque to decelerate the conveyed objects 26 in the conveying direction 14. The rollers 22 in the first zone Z1 give an impulse of deceleration to an object 26, which reduces its speed by an amount that is inversely proportional to its weight. In the second zone Z2, an acceleration zone at the exit of the transfer device 20, the active rollers 22 are rotated by another LIM stator to accelerate the objects 26 back up to their initial speeds upon entering the roller transfer device. In the third zone Z3, a middle zone between the deceleration zone Z1 and the acceleration zone Z2, the rollers are passive and not rotated by a LIM. Objects 26 in the middle zone Z3 coast across the freely rotatable idle rollers at a coast speed produced by the deceleration impulse in the first zone Z1. In this example an upstream sensor P1 is positioned at the entrance to the first zone Z1. A downstream sensor P2 is positioned near the end of the middle zone Z3. The timing diagram in FIG. 7 shows the outputs of the sensors P1 and P2 for a standard heavy object A followed by an underweight light object B. The heavy object A receives a deceleration impulse during a short time period $\Delta t_{dA}$ shortly after the front edge of the object breaks the light beam of the upstream sensor P1. During that deceleration impulse, the heavy object's speed drops. The change in speed is indicated by $\Delta v_A$. The deceleration caused by the constant-torque rollers on the heavy object is given by the slope of the speed-time relationship in the third line of FIG. 7. The object then coasts at a coast speed $v_{CA}$ in the middle zone Z3. The downstream sensor detects the heavy object A and computes a weight from the time of passage of the object from the position of the sensor P1 to the position of the sensor P2. The active rollers in the second zone Z2 then provide an impulse of acceleration to the object A to speed it up to its speed upon entry to the roller transfer device 20 or to a greater speed, if desired. The weight of a lighter object B is similarly determined. The difference is that the light object B decelerates to a lower speed ($\Delta v_B > \Delta v_A$) than the heavier object A. That difference in deceleration is indicated by the steeper slope of the speed characteristic in the deceleration region $\Delta t_{dB}$ of the light object B. In the second zone Z2, the light object B is accelerated back to its speed on entering the roller transfer device or to a greater speed.

Figure 8:
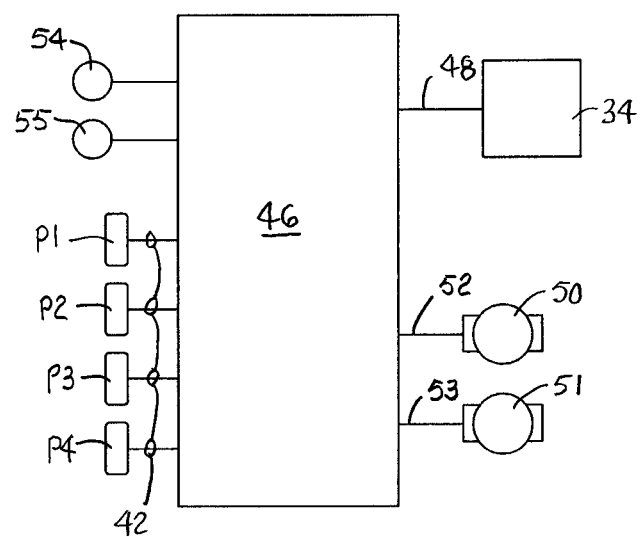
FIG. 8 is a block diagram of a control system for a conveyor system as in FIG. 1.

A block diagram of a control system for the conveyor system is shown in FIG. 8. A controller 46 receives the output signals from the sensors P1-P4, over sensor signal lines 42 and determines the weights of the objects as part of the sensor system and the roller checkweigher. The controller 46 can also control the stator's VFD 34 over a LIM control line 48. And the controller 46 can optionally control the speeds of the upstream and downstream conveyors by controlling their drive motors 50, 51 over motor control lines 52, 53. Other optional sensors that may be used to make the weight determination more robust include speed sensors, such as tachometers 54, 55, attached to the drive shafts of the upstream and downstream conveyor belts.

Although the invention has been described with respect to a few preferred versions, other versions and modifications to the exemplary versions are possible. For example, the optical sensors with reflectors could be replaced by transmitter-receiver pairs on opposite sides of the conveyor or by proximity switches or by visioning systems. Instead of position sensors, speed sensors could be used to determine the change in an object's motion caused by the constant-torque rollers. As another example, the upstream and downstream conveyors could be roller conveyors instead of the belt conveyors shown.

What is claimed is:

1. A weighing conveyor system comprising:
   an upstream conveyor having a downstream end and conveying objects in a conveying direction to the downstream end;
   a downstream conveyor having an upstream end and receiving the objects conveyed by the upstream conveyor;
   a roller transfer device interposed between the downstream end of the upstream conveyor and the upstream end of the downstream conveyor and transferring the objects received from the upstream conveyor to the downstream conveyor in the conveying direction, the roller transfer device including:
   a roller drive system;
   an array of rollers, at least some of which are active rollers rotated by the roller drive system at a constant torque to propel the objects received from the upstream conveyor in the conveying direction to the downstream conveyor, wherein the acceleration of each of the objects in the conveying direction on the roller transfer device is inversely proportional to the object's weight;
   a sensor system determining the change in the gap between consecutive objects or in the spacing of consecutive objects before and after they are propelled in the conveying direction by the active rollers to determine the weight of each of the objects.

2. A weighing conveyor system as in claim 1 wherein the roller drive system comprises a linear-induction-motor stator producing a magnetic flux wave passing through the active rollers and wherein the active rollers include electrically conductive material interacting inductively with the magnetic flux wave to rotate the active rollers at constant torque to propel the objects on the roller transfer device in the conveying direction.

3. A weighing conveyor system as in claim 1 wherein the sensor system detects each of the objects at one or more positions along the conveying direction.

4. A weighing conveyor system as in claim 1 wherein the sensor system comprises a first pair of sensors near the downstream end of the upstream conveyor to measure the gap between or spacing of consecutive objects entering the roller transfer device and a second pair of sensors near the upstream end of the downstream conveyor to measure the gap between or spacing of consecutive objects exiting the roller transfer device.

5. A weighing conveyor system as in claim 1 wherein the sensor system comprises a pair of sensors at spaced apart locations in the conveying direction along the roller transfer device.

6. A weighing conveyor system as in claim 1 wherein a first group of the active rollers in the roller transfer device form a first roller zone adjacent the downstream end of the upstream conveyor and a second roller zone downstream of the first roller zone in the conveying direction and wherein the array of rollers includes passive rollers forming a middle roller zone between the first and second roller zones, wherein the objects entering the roller transfer device at a first speed are decelerated in the first roller zone to a coast speed, allowed to coast at the coast speed in the middle roller zone to the second roller zone, and accelerated in the second roller zone to exit the roller transfer device at a second speed.

7. A weighing conveyor system as in claim 6 wherein the second speed equals the first speed.

8. A weighing conveyor system as in claim 6 wherein the sensor system determines the coast speed.

9. A checkweigher comprising:
   a roller transfer device including:
   a roller drive system;
   an array of rollers, at least some of which are active rollers rotated by the roller drive system at a constant torque to propel objects in a conveying direction, wherein the acceleration of each of the objects in the conveying direction on the roller transfer device is inversely proportional to the object's weight;

a sensor system determining the change in the gap between consecutive objects or in the spacing of consecutive objects before and after they are propelled in the conveying direction by the active rollers to determine the weight of each of the objects.

10. A checkweigher as in claim 9 wherein the roller drive system comprises a linear-induction-motor stator producing a magnetic flux wave passing through the active rollers and wherein the active rollers include electrically conductive material interacting inductively with the magnetic flux wave to rotate the active rollers at constant torque to propel the objects on the roller transfer device in the conveying direction.

11. A checkweigher as in claim 9 wherein the sensor system comprises a controller and two or more position sensors providing output signals to the controller indicating the positions of objects upstream and downstream of the active rollers from which the controller computes the weights of objects.

12. A method for weighing conveyed objects, comprising:
conveying objects separated by a gap in a conveying direction to an array of rollers;
rotating the array of rollers with a constant torque to accelerate each of the objects in the conveying direction to a speed that is inversely proportional to the weight of the object;
determining the weight of each of the objects from the change in the gap caused by the array of rollers.

13. The method of claim 12 wherein the objects are conveyed to the array of rollers with the same gap between consecutive objects.

* * * * *